May 21, 1968  R. B. SOMMER  3,384,143
NONSKID TIRE
Original Filed Dec. 20, 1965  2 Sheets-Sheet 2
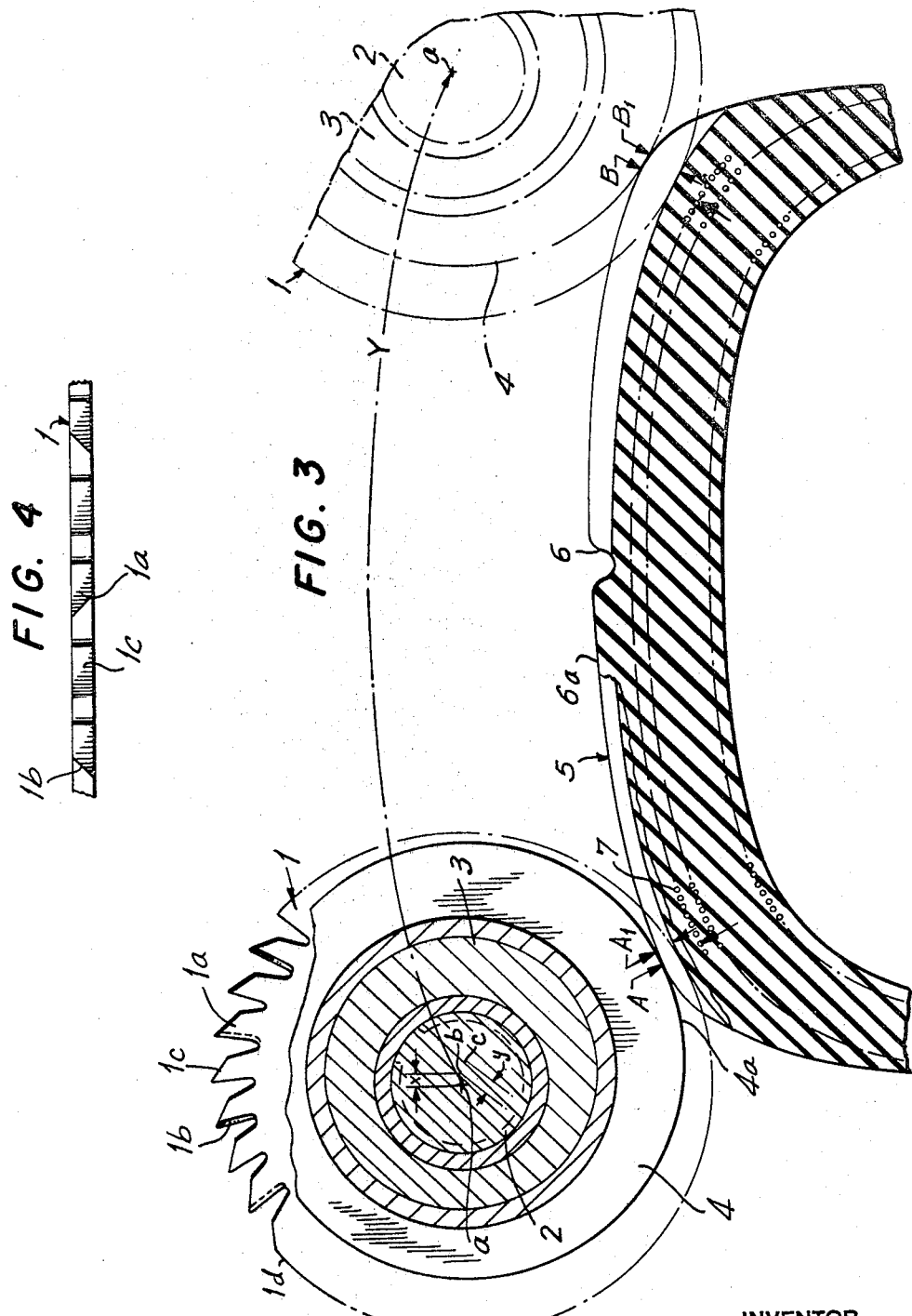
INVENTOR
ROBERT B. SOMMER

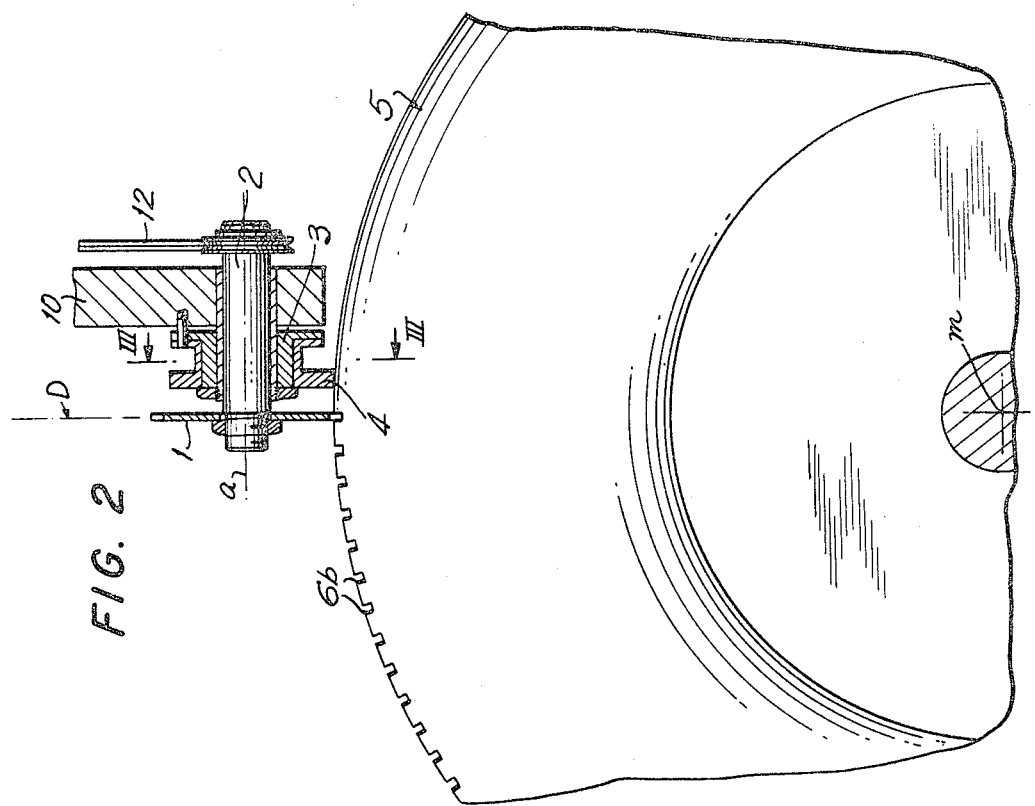

3,384,143
NONSKID TIRE
Robert B. Sommer, 46 Laurie Drive,
Englewood Cliffs, N.J. 07632
Original application Dec. 20, 1965, Ser. No. 488,566.
Divided and this application Jan. 23, 1967, Ser.
No. 636,225
2 Claims. (Cl. 152—209)

ABSTRACT OF THE DISCLOSURE

The present invention is drawn to a modified pneumatic tire having an annular carcass, a tread of uneven thickness circumferentially and axially of the carcass, the tread being provided with spaced transverse grooves wherein the thickness of each groove along the length thereof is proportional to the tread as seen in an axial plane containing each groove, so that the bottoms of all the grooves are spaced substantially the same distance from the periphery of the carcass with each groove having a constant width and the depth of at least the major part of each groove is substantially greater than its width.

---

The present application is a divisional application of the invention as described in co-pending Ser. No. 488,566 filed Dec. 20, 1965.

This invention relates to a modified tire and the process and apparatus for making the same. More particularly this invention relates to a process and apparatus for cutting transverse grooves in tires having a non-uniformly worn resilient tread.

It is generally known to provide vehicular tires with transverse grooves for increased adherence on wet pavement. Such grooved tire treads and their action on wet pavement are more specifically described in the U.S. Patent No. 2,104,532 to which reference may be had if necessary. In order to obtain the desired result, there are provided in the surface of the tread of a pneumatic or other tire, grooves or channels formed in such a manner that the tire bears on the ground through a series of sharp edges, i.e., the supporting surface of the tire on the ground forms a series of sharp edges when it is flexibly deformed under the action of the tangentially directed forces produced by contact with the ground.

The sharp edges with which the tire bears on the ground causes the rupture of the film of water which is found between the tread and the ground when the latter is smoooth and wet. The aforesaid film acts as a lubricant to reduce the adherence of the tire, and the rupture of the film by the aforesaid sharp edges allows the tire to have the same adherence on wet ground as it would on dry ground.

The problems caused by the aforesaid film of water become more serious with increasing speed. Thus, a particularly serious situation exists during the landing of a high-speed aircraft on a slick runway. Furthermore, tires used on aircraft, particularly high-speed aircraft, are subjected to substantial, but non-uniform, wear. As a result the treads of aircraft tires are frequently unevenly worn andd exhibit substantial variations in thickness circumferentially as well as transversely.

It is an important object of the present invention, therefore, to provide an apparatus for cutting transverse grooves of maximum depth on the periphery of tires having non-uniformly worn treads, while not injuring the carcass of the tire.

It is another important object of the present invention to provide a machine of the above type which can be manually controlled for greatest versatility with tires of varying uniformity.

Another object of the invention is to provide an improved cutting means for forming grooves in the resilient tire material.

Still another object of the invention is to provide an improved guiding arrangement for guiding a cutter along the surface of a non-uniform tire tread while permitting a variation in the groove depth therealong.

A further object is to provide an apparatus having the above outlined characteristics and with which staggered transverse grooves of predetermined length can be cut in the tread of a tire, with the length of individual grooves being determinable by the operator at will.

An additional object of the present invention is to provide a method of cutting transverse grooves in the tread of a tire which is worn unevenly with respect to the carcass thereof.

A concomitant object of the invention is the provision of a pneumatic or other tire, having non-unformly thick tread portions, with grooves which increase the adherence of the tire on wet ground.

With the above objects in view, one feature of the invention resides in the provision of a grooving apparatus comprising frame means, tire indexing support means mounted on the frame means, and rotary cutter means movably supported on the frame means in a region adjacent to the tread of a tire supported on the indexing support means. The rotary cutter means are movable by hand in directions radial to and parallel with the axis of the tire so as to cut transverse grooves of varying length in the tread of the tire. In accordance with my invention, the rotary cutter means is guided along the surface of a non-uniform tread by guide means which are adjustable and which preferably assume the form of two eccentric cams positioned one within the other and mounted adjacent the cutter means.

Another feature of my invention is the provision of cutter means comprising a rotary cutter having side cutting teeth sharpened on alternate sides and alternating with raker teeth of equal length for cutting well-defined grooves in rubber-like material.

Another feature of the present invention is the provision of a method for cutting transverse grooves in the tread of a tire, including the steps of removing material from the tread in a direction substantially parallel to the axis of the tire so as to form transverse grooves therein, and regulating the depth of the material removed so that the bottom of each groove is spaced substantially the same distance from the periphery of the carcass, irrespective of the nonuniformity of the tread thickness.

Certain other features of my invention reside in the provision of a specially configurated tire tread, particularly of an aircraft tire, arranged to force corner edges of staggered transverse grooves, through the liquid film on the surface of a wet runway, when the tire is subjected to strain during landing of the aircraft so as to increase the adherence of the tire on the engaging runway surface at such critical time.

The novel features which are considered as characteristic of the invention are set forth in particular in the appended claims. The invention itself, however, both as to its construction and its method of operation, together with additional objects and advantages thereof will be best understood from the following detailed description of certain specific embodiments with reference to the accompanying drawings in which:

FIG. 1 is a schematic side elevational view of one embodiment of the grooving apparatus according to the present invention;

FIG. 2 is a enlarged, partly sectional, view of the rotary cutter and guide means taken along line 11—11 of FIG. 1;

FIG. 3 is a still further enlarged, fragmentary, transverse sectional view of the rotary cutter, guide means and tire tread as seen in the direction of arrows 111—111 of FIG. 2;

FIG. 4 is a plan view of a portion of the cutter blade illustrated in FIG. 3.

Referring now in greater detail to the drawings, and first to FIG. 1, there is shown a grooving apparatus including a frame 20, and a lever 9 pivotally connected to frame 20 for rocking movement about a first horizontal pivot axis $p$. One end of a link 10 is pivotally connected to one end of the lever 9 for rocking movement about a second horizontal axis $n$ which is substantially parallel to the axis $p$. At its other end the lever 9 carries a suction means comprising a blower 13 which latter constitutes a counterbalancing weight means in the preferred embodiment illustrated in FIG. 1. The weight of blower 13 and its location at the end of lever 9 are chosen to counterbalance the weight of link 10 as well as the parts carried thereby so as to normally maintain the lever 9 in a substantially horizontal position.

Rotary cutter means 1 having an axis of rotation $a$, parallel to the axes $n$ and $p$, is mounted near one end of shaft 2, which is supported in a suitable bearing at the lower end of link 10. Rotary cutter means 1 is connected to shaft 2 for rotation therewith and at least the peripheral cutting portion of rotary cutting means 1 extends below the lower end of link 10 so as to project therefrom.

The link 10 is also provided at its lower end with a handle 15 which may be readily grasped by an operator to move link 10 and the rotary cutter means 1, carried thereby, in a plurality of directions in the plane of the cutter means, namely, plane D shown in FIG. 2. It is, of course, not necessary that the axes $a$, $n$, and $p$ be horizontal so long as they are substantially parallel to one another.

Indexible tire supporting means 8, carried by frame means 20 in the region below the cutter means 1, support a tire 5 for indexing about an axis $m$ which, in the embodiment illustrated in FIG. 1, lies in the plane D of the cutter 1. The fixed axis $m$ coincides with the axis of the tire 5 and is spaced from axis $n$.

While the indexable supporting means 8 is shown in FIG. 1 to be a manually operated detent mechanism, namely, a spring biased member 8a cooperating with detents in the adjacent rotary member to permit manual rotation of the tire 5 into predetermined angular positions, many other known indexing devices are equally suitable for the desired purpose. Thus for example, well known automatic indexing devices would be entirely suitable.

The drive means for driving the rotary cutter means 1 comprises a drive motor 11, preferably mounted directly on the frame means 20, and a belt and pulley transmission 12 connecting the output shaft of drive motor 11 with shaft 2. Transmission 12 preferably includes pulleys carried by lever 9 coincident with and rotatable about the axes $n$ and $p$. Drive motor 11 may, alternatively, be mounted on lever 9 so as to coact with or even replace blower 13 as a counterweight, or directly on link 10 so as to directly drive the shaft 2.

A biasing means 21 is arranged to permanently bias link 10 toward frame means 20 in a counterclockwise direction about axis $n$. Biasing means 21 may comprise a pulley carried by frame 20 and a weight tending to pull one end of a cord which is looped about the pulley and is connected at its other end to link 10.

Conduit means 14 preferably consists of a flexible tube having an intake end in the region of the rotary cutter 1 and connected at its other end to the blower 13, so that when the blower is operating, tire material cut by the rotary cutter is drawn into the intake end of conduit means 14 by the suction produced by blower 13, for removal from the work area.

Adjacent the rotary cutter means 1 there is mounted on the link 10 an adjustable guide means 3, 4 illustrated in greater detail in FIGS. 2 and 3, and fixed in relation to link 10 during operation of the cutter means 1. As best seen in FIG. 3, the adjustable guide means includes an inner cam 3, constituting first regulating means, angularly adjustable about the axis $a$ of the rotary cutter. Cam 3 is provided with a cylindrical peripheral surface whose axis $b$ is parallel to but spaced from the axis $a$ about which cam 3 is turnable for adjustment, so that the surface of cam 3 is eccentric with respect to axis $a$.

An annular cam 4 is mounted for turning movement about the cylindrical surface of cam 3. The former having a bore extending axially therethrough and slidingly receiving the peripheral surface of cam 3. Cam 4 constitutes second regulating means and is also preferably provided with a cylindrical peripheral surface, having an axis $c$ spaced a distance $y$ from the axis $b$ of the cylindrical surface of cam 3. Axis $b$ being spaced a distance $x$ from the axis $a$ of the rotary cutter means 1. The peripheral surface of annular cam 4 forms the guide surface which is in actual guiding contact with the peripheral surface of the tire 5 during the grooving operation.

Cams 3 and 4 are both preferably provided with radially slotted annular flanges as seen in FIG. 2 and constituting, together with a pin fixed to the link 10, a locking arrangement for locking the cam means 3 and 4 in any relative adjusted angular position with respect to each other and to the axis $a$. Thus, cams 3 and 4 are radially adjustable with respect to each other and may then be moved axially toward the fixed pin so that the latter passes through a pair of coinciding slots to prevent further relative angular movement.

Alternatively, of course, the pin may be detachably connected to link 10 so that the cams 3 and 4 may be angularly adjusted in place and the pin passed through coinciding slots, after the proper adjustment is achieved, and connected to the link.

The two eccentric cams 3, 4 cooperating with each other in the described manner permit an operator to control the groove depth with a versatility heretofore impossible. Thus, in a simple and quick manner the groove depth can be changed from tire to tire, from one groove to the next adjacent groove, and even from one end of one groove to the other end thereof. With the arrangement of the present invention it is possible to quickly and easily vary both the cutting depths $A_1$ and $B_1$, i.e., the depth of a groove to be cut can be adjusted to vary from a first predetermined value at one side of the tire to a second predetermined value at the other side of the tire. Thus, with the described arrangement, it is possible to control not only the maximum amount of penetration of the cutting portion of cutter 1, and thus the maximum groove depth, but at the same time and with a very simple adjustment it is possible to also control both the initial ($A_1$) and the final ($B_1$) depths of penetration.

Uneven wear of vehicular tires is unavoidable and the extent of such uneven wear depends in part upon the alignment characteristics of the particular vehicular structure on which the tire is mounted. Like fingerprints, practically no two vehicular tires will be worn in the same manner and to the same degree. Thus, any operation performed on the worn treads of a tire becomes an individual matter and is best accomplished manually. An operator can, by eye, best determine the extent or tread wear, not only the variations from one tire to the next but also the variations in thickness from one portion of a tire to another portion thereof.

Aircraft tires, in particular, frequently display substantial wear at limited portions of their periphery as a result of the severe punishment received by such limited portions during landing and rapid braking thereafter.

As will be observed from an examination of FIG. 3, the tire 5, illustrated in partial transverse section, has an unevenly worn tread 6 which varies from a thickness A at the left, as seen in FIG. 3, to a thickness B at the right. The dimensions A and B representing the distance between the outermost layer of carcass chords 7 and the peripheral surface 6a of the tread at the left and the right hand portions thereof, respectively.

Referring to FIG. 1, the tire 5 is mounted on indexable support means 8, for indexing about a fixed axis $m$. Tire 5 is arranged below the cutter 1 so that the latter may be manually moved axially with respect to the tire, across the upwardly facing portion of the tread of the tire, substantially in a plane normal to the axes $n$, $p$, and $a$, for cutting transverse grooves 6b in the tread, as more clearly illustrated in FIG. 3. As will be later described in more detail, the grooves 6b on one side of the central circumferential groove are staggered with respect to the grooves 6b on the other side of the central groove.

It is desireable, when cutting transverse grooves in the tread of a tire for the non-skid effect previously indicated, that such grooves be cut to a depth which is uniform with respect to the carcass of the tire, yet independent of the variations in tread thickness. In this manner a maximum groove depth may be achieved without risking injury to the carcass in those regions where the tire tread is worn the most.

In operating on a tire 5, worn as illustrated in FIG. 3, the guide means 3, 4 are adjusted relative to one another and to the rotary cutter 1, as illustrated, so as to provide a shallower cut $A_1$ in the region of greatest tread wear, and a heavier cut $B_1$ in the region of least tread wear. Thus, the cams 3, 4 permit an adjustment whereby the grooves which are cut have depths varying in proportion to the tread thickness and the bottoms of all the grooves can be spaced substantially at equal distances from the outermost portions of the carcass 7. With the arrangement previously described, the cam 4 is turnable about a second axis $c$, parallel to the axis $a$ of the cutter means, and the cam 3 constitutes adjusting means for changing the position of cam 4 in at least one direction other than about the second axis $c$, so that variations in groove depth may be obtained along the length of a particular groove.

In accordance with the invention, it is found that the best anti-skid results are achieved for aircraft tires when the latter are provided with staggered transverse grooves such as grooves 6b, illustrated in FIG. 1. Each groove preferably has a constant width and the depth of at least the major part of each groove is preferably substantially greater than its width, so that the grooves define between themselves distinct strips which tilt when subjected to strain, whereby each strip is caused to present a corner edge to the surface with which the tire is in engagement so as to provide a non-skid contact therebetween. The modified tire 5, according to the present invention, has grooves 6b preferably arranged in such a manner that the width of the strip separating two adjacent grooves is in the range of between 22 to 27 millimeters. The groove depth is preferably in the range of 4.5 to 8 millimeters, and the groove width is preferably in the range of 1 to 3.5 mm., with the wider groove widths corresponding to the shallower depths. The tire 5 is preferably provided with at least one circumferential groove such as the centrally located groove shown in FIG. 1, with the transverse grooves 6b extending at both sides of the circumferential groove and the transverse grooves at one side being staggered circumferentially with respect to the grooves at the other side thereof. It is, of course, frequently desirable to provide two or more circumferential grooves in the tread, in such instance it has been found advantageous to stagger the transverse grooves circumferentially on opposite sides of each circumferential groove.

The apparatus according to the present invention is particularly advantageous for grooving unevenly worn tire treads where it is further desired to stagger the transverse grooves as shown in FIG. 1, and even more so when it is desired to stagger the transverse grooves intermediate two or more circumferential grooves with respect to grooves located outwardly of such circumferential grooves.

Automatic equipment having the capability to automatically determine tread thickness variations not only from tire to tire but along the circumference of, and transversely of, any particular tire, would be extremely complicated and expensive to produce and to maintain. On the other hand, with the process and apparatus according to the present invention, it is possible to manually move the cutter 1 not only in a direction transverse to the tire, i.e., in the direction Y of FIG. 3, but also radially, i.e., in a direction toward and away from the tire axis, so as to permit the cutting of transverse grooves of any desired length. In other words, according to the present invention, the cutter 1 can be moved into cutting engagement with the tread at any location along the tread surface, not necessarily a shoulder thereof, moved transverdsely any desired distance to cut a groove and then withdrawn radially upon reaching the desired groove length.

As another feature of the present invention, there is provided a rotary cutter blade 1 with side cutting teeth 1a and 1b constituting the cutting portion thereof. The teeth 1a and 1b are respectively sharpened on alternate sides of the cutter blade 1 as best seen in FIG. 4. Interposed between at least some of the pairs of teeth 1a and 1b are raker teeth 1c having transverse edge portions substantially parallel to the axis of the cutter 1 and arranged to scrape out the rubber, or rubber-like tire tread material between the pair of slits cut by the opposing side cutting teeth 1a and 1b. Thus, the material left between the pair of slits cut by the opposing side cutting teeth, is scraped out by the transverse edge portion of the raker teeth, which transverse edge portion is located on the periphery of the circle described by the outermost portion of the side cutting teeth. All of the teeth, therefore, have identical lengths so that the transverse edge portion of the raker teeth is spaced the same distance from the axis of the cutter 1, as the outermost portion of the cutting teeth, whereby well-formed grooves are obtained in the tire tread.

In operating the cutting apparatus according to the present invention, the operator, by grasping the manual operating means, handle 15, selectively moves 1 in a plurality of directions in plane D seen in FIG. 2. In plane D, the operator can move the cutter means 1 in directions including radially of and in parallelism with the axis $m$ which coincides with the axis of tire 5. Thus, transverse grooves of any desired length can be cut in the tread. During movement transversely of the tire, i.e., in parallelism with axis $m$, the guide means 3, 4 track the tread surface 6a of the tire along a path determined by the outline of the portion of the tread located in plane D.

With the link 10 in the position of FIG. 1, and with the cutter blade 1, rotating in a counter-clockwise direction as viewed in FIG. 1, a reaction force tending to move the link 10 in a clockwise direction about the axis $n$, i.e., moving the handle 15 toward the operator, results from engagement of the rotating cutter blade with the left-hand shoulder of the tire tread, and must be overcome by the operator in order to move the cutter toward the right so as to cut a transverse groove. To assist the operator in counteracting the aforesaid reaction force, a biasing means including, in the embodiment illustrated, a counterweight and pulley arrangement 21, is connected to the lower portion of link 10 so as to permanently urge the same in a direction opposite to the reaction force described above. A shock-absorber (not illusrated) can be connected between the frame means 20 and the link 10 so as to further assist in overcoming the sudden impact caused by the initial engagement between the rotary cutter and the tire tread.

It will also be noted that more than one cutter blade can be mounted on link 10 so that two or more grooves can be cut simultaneously if desired. Where more than one blade is so mounted they can, of cource, be of varying thickness so that grooves of varying thickness can be cut simultaneously. Nor is it necessary that the cutter means 1 be mounted so that the plane of the latter, namely plane D, contains or even passes through the axis $m$, since the grooves 6b need not be axially and radially true with respect to the axis $m$ but can have an angular relationship therewith. Also, by using two cutters of different blade diameter as well as different blade thickness, a staggered groove system of wide shallow grooves alternating with narrow deeper grooves can be conveniently cut.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention, and, therefore, such adaptations should and are intended to be comprehended within the meaning and range of equivalence of the following claims.

What is claimed as new and desired to be secured by Letters Patent is:

1. A pneumatic tire having an annular carcass and a tread surrounding the periphery of said carcass, said tread being provided with a plurality of closely spaced transverse grooves circumferentially distributed thereabout, a first number of said grooves having a depth proportional along the length thereof to the thickness of said tread as seen in an axial plane containing said respective groove so that the bottoms of all said first number of grooves are spaced substantially the same distance from the periphery of said carcass, a second number of grooves having a depth different from the depth of said first number of grooves and proportional along the length thereof to the thickness of said tread as seen in an axial plane containing said respective groove so that the bottoms of all said second number of grooves are spaced substantially the same distance from the periphery of said carcass, each of said first number of grooves having a constant width, each of said second number of grooves having a constant width greater than the width of each said first groove, the depth of the major part of each groove being greater than its width, at least one circumferential groove on said carcass, said transverse grooves extending at both sides of said circumferential groove, said transverse grooves at one side staggered circumferentially with respect to the transverse grooves at the other side whereby said grooves define between themselves distinct strips which tilt when subjected to strain thereby to cause each strip to present a corner edge to the surface with which the tire is in engagement.

2. A tire as claimed in claim 1 wherein said first number of said grooves and said second number of said grooves are alternately arranged about said tire.

References Cited

UNITED STATES PATENTS

| | | | |
|---|---|---|---|
| 2,104,532 | 1/1938 | Sommer | 152—209 |
| 3,000,421 | 9/1961 | Hack et al. | 152—209 |

ARTHUR L. LA POINT, *Primary Examiner.*